United States Patent
Jiao et al.

(10) Patent No.: US 11,366,234 B2
(45) Date of Patent: Jun. 21, 2022

(54) METHOD AND SYSTEM FOR PREVENTING LEAKAGE OF BEIDOU DIFFERENTIAL POSITIONING DATA

(71) Applicant: BEIJING GAS GROUP COMPANY LIMITED, Beijing (CN)

(72) Inventors: Jianying Jiao, Beijing (CN); Tao Zhang, Beijing (CN); Yanshuang Li, Beijing (CN); Shaoping He, Beijing (CN); Xiaolin Qi, Beijing (CN)

(*) Notice: Subject to any disclaimer, the term of this patent is extended or adjusted under 35 U.S.C. 154(b) by 336 days.

(21) Appl. No.: 16/611,379

(22) PCT Filed: Jul. 3, 2019

(86) PCT No.: PCT/CN2019/094478
§ 371 (c)(1),
(2) Date: Nov. 6, 2019

(87) PCT Pub. No.: WO2020/011070
PCT Pub. Date: Jan. 16, 2020

(65) Prior Publication Data
US 2021/0356603 A1    Nov. 18, 2021

(30) Foreign Application Priority Data
Jul. 9, 2018 (CN) .......................... 201810742420.5

(51) Int. Cl.
*G01S 19/37* (2010.01)
*G01S 19/41* (2010.01)

(52) U.S. Cl.
CPC .............. *G01S 19/37* (2013.01); *G01S 19/41* (2013.01)

(58) Field of Classification Search
CPC ................................ G01S 19/37; G01S 19/41
See application file for complete search history.

(56) References Cited

FOREIGN PATENT DOCUMENTS

| CN | 101620700 A | 1/2010 |
| CN | 202587140 U | 12/2012 |
| CN | 203250026 U | 10/2013 |
| CN | 105716602 A | 6/2016 |
| CN | 205656311 U | 10/2016 |
| CN | 205983484 U | 2/2017 |
| CN | 206096469 U | 4/2017 |
| EP | 2200257 A1 | 6/2010 |

*Primary Examiner* — Dao L Phan
(74) *Attorney, Agent, or Firm* — Novoclaims Patent Services LLC; Mei Lin Wong

(57) ABSTRACT

The present disclosure discloses a method and a system for preventing leakage of Beidou differential positioning data. The method includes the following steps: step 1, determining the number of positioning terminals; step 2, making identification cards, wherein one identification card corresponds to one positioning terminal, and writing data into each identification card; step 3, putting the identification cards into the card slots of the positioning terminals corresponding to the identification cards; step 4, verifying whether the read data is accurate; step 5, generating the Beidou differential positioning data by the positioning base station, a positioning satellite and the positioning terminals operating normally. The system includes a positioning base station, a positioning satellite, a service terminal, a card issuing device, a plurality of identification cards and a plurality of positioning terminals.

18 Claims, 2 Drawing Sheets

METHOD AND SYSTEM FOR PREVENTING LEAKAGE OF BEIDOU DIFFERENTIAL POSITIONING DATA

CROSS-REFERENCE TO RELATED APPLICATIONS

This application is based upon and claims priority to Chinese Patent Application No. 2018107424205, entitled "METHOD AND SYSTEM FOR PREVENTING LEAKAGE OF BEIDOU DIFFERENTIAL POSITIONING DATA", filed Jul. 9, 2018. The entire contents of which are incorporated herein by reference.

TECHNICAL FIELD

The present disclosure relates to the field of Beidou differential positioning data safety technologies, and more particularly, to a method and a system for preventing leakage of Beidou differential positioning data.

BACKGROUND

At present, people are in the era of big data, and data shows explosive growth. With the development of Internet of Things technology, the number of intelligent terminal devices is also increasing, and most intelligent terminal devices have a positioning function, and thus positioning data has increased exponentially. Due to security and other reasons, the control of the positioning data becomes increasingly strict, thereby avoiding the use of the positioning data by criminals, and endangering the safety of people's lives and property.

However, for a positioning system in the prior art, the terminal devices in the positioning system must be configured by the installer, and the installer will come into contact with relevant configuration information during the information configuration process. For example, the installer can use the relevant configuration information to access a server storing the positioning data, so as to obtain the positioning data, or due to the negligence of the installer, the relevant configuration information is maliciously obtained by others, and others can obtain the positioning data; finally, the leakage problem of the positioning data of the terminal device is caused.

Therefore, how to effectively avoid the leakage of the positioning data of the terminal devices and protect the safety of the positioning data has become a technical problem to be solved urgently by a person skilled in the art and has always been the focus of research.

SUMMARY

In order to solve the problem in the prior art that positioning data of a terminal device can be leaked, the present disclosure innovatively provides a method and a system for preventing leakage of Beidou differential positioning data, which can effectively prevent an installer from contacting relevant information of the terminal device and fundamentally avoid the leakage of the positioning data.

In order to achieve above technical objectives, the present disclosure discloses a method for preventing leakage of Beidou differential positioning data, the method includes the following steps:

step 1, determining the number of positioning terminals to be used according to the area of an area to be positioned, and setting a first number for each positioning terminal respectively, wherein the positioning terminals are provided with card slots for placing identification cards;

step 2, making the identification cards through a card issuing device, wherein the number of the identification cards is the same as that of the positioning terminals; in the process of making the identification cards, setting a second number for each identification card respectively, wherein the second number corresponds to the first number one by one, so that one identification card corresponds to one positioning terminal, and writing data into each identification card respectively according to the positioning terminal corresponding to each identification card;

step 3, installing at least one positioning base station and each positioning terminal in the area to be positioned, putting each identification card into the card slot of the positioning terminal corresponding to the identification card, and enabling each positioning terminal to automatically read data in the identification card in the card slot;

step 4, transmitting, by each positioning terminal, the data read by each positioning terminal to a service terminal, and verifying whether the read data is accurate through the service terminal, sending, by the service terminal, verification success information or verification failure information to each positioning terminal according to verification results, and starting, by the positioning terminal, to operate normally when receiving the verification success information; and step 5, generating the Beidou differential positioning data by the positioning base station, a positioning satellite and the positioning terminals operating normally, and storing the Beidou differential positioning data in each positioning terminal correspondingly.

Based on above technical solutions, the present disclosure innovatively provides the identification cards matched with the positioning terminals, the installer only need to insert the identification cards into the card slots of the positioning terminals during configuration, and thus effectively preventing the installer from contacting relevant information of the positioning terminals, avoiding the leakage of the positioning data and protecting the positioning data; and further reducing the workload of the installer and improving the configuration efficiency. In addition, unlike the positioning data stored by the conventional server, the Beidou differential positioning data of the present disclosure is stored in each positioning terminal correspondingly, so that the safety of the Beidou differential positioning data can be further protected.

BRIEF DESCRIPTION OF THE DRAWINGS

To describe the technical solutions in the present disclosure more clearly, the following briefly describes the accompanying drawings required for describing the implementations.

In FIG. 2, "1" represents a positioning satellite; "2" represents a positioning base station; "3" represents a service terminal; "4" represents identification cards; and "5" represents positioning terminals.

DETAILED DESCRIPTION

The method and the system for preventing leakage of Beidou differential positioning data according to the present disclosure will be explained and clarified in detail below with reference to drawings of the description.

First Embodiment

Figure 1:
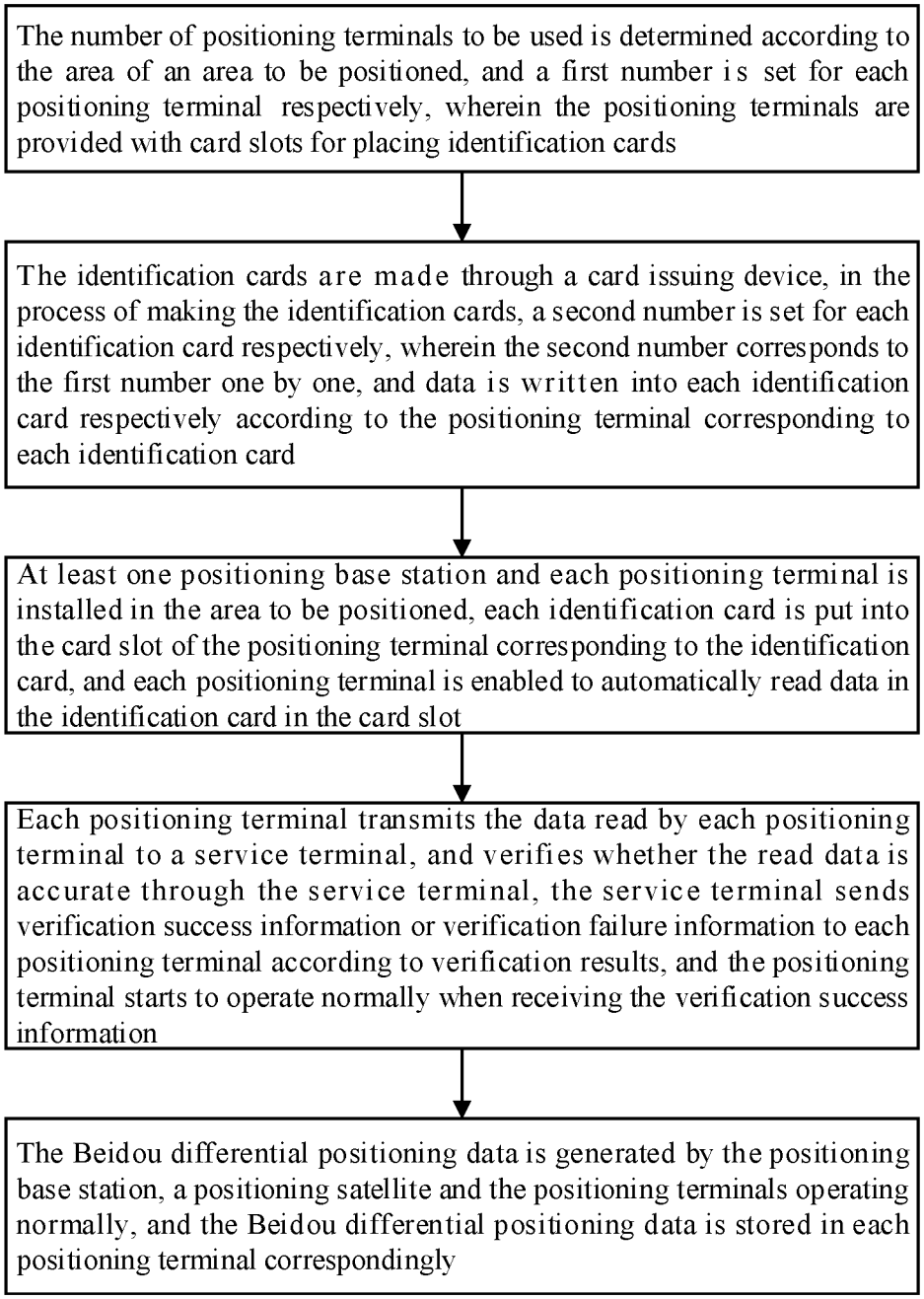
FIG. 1 is a schematic flowchart of a method for preventing leakage of Beidou differential positioning data.
Figure 2:
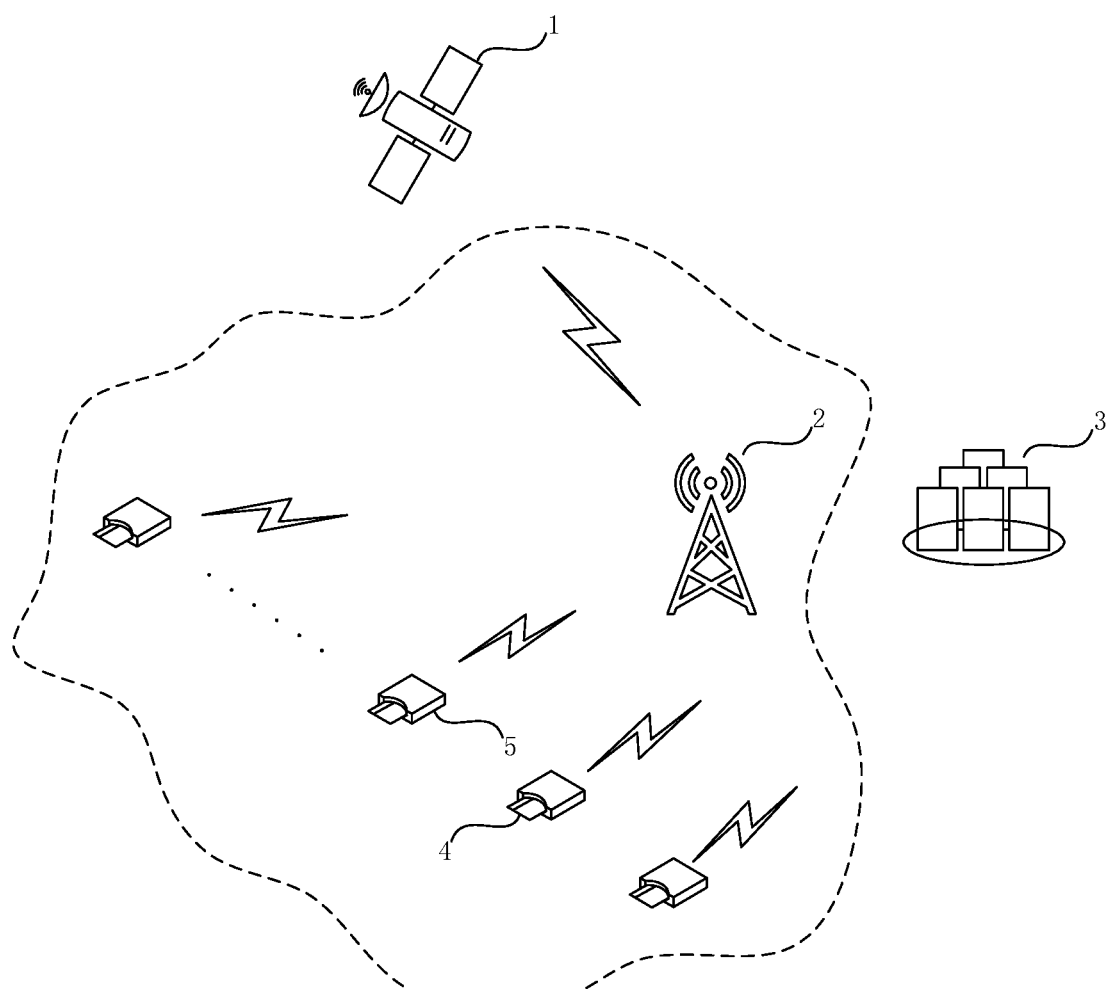
FIG. 2 is an implementation state diagram of a system for preventing leakage of Beidou differential positioning data.

As shown in FIG. 1 and FIG. 2, the present embodiment discloses a method for preventing leakage of Beidou differential positioning data, the method includes the following steps.

Step 1, after determining a positioning item, a staff will determine the number of positioning terminals to be used according to the area of an area to be positioned, and set a first number for each positioning terminal respectively, wherein the positioning terminals are provided with card slots for placing identification cards. In the present embodiment, this step further includes the step of determining the number of positioning base stations to be used according to the area of the area to be positioned, and further includes the step of determining the positions of each positioning terminal and each positioning base station according to the area to be positioned. After the above steps are completed, a determined number of positioning terminals without SIM cards are configured for the positioning item, and then the configured positioning terminals and the positioning base station are installed to a planned position.

Step 2, the identification cards are made through a card issuing device (or SIM card issuing system), wherein the number of the identification cards is the same as that of the positioning terminals. In the present embodiment, the identification cards are SIM cards. In the process of making the identification cards, a second number is set for each identification card respectively, wherein the second number corresponds to the first number one by one, so that one identification card corresponds to one positioning terminal, and data is written into each identification card respectively according to the positioning terminal corresponding to each identification card. In the present embodiment, the data written into the identification cards includes a server address, a port, an account number, a user name, a password and a transmission protocol. The present embodiment can effectively prevent the installer from contacting the data written into the identification cards.

Step 3, the installer installs at least one positioning base station and each positioning terminal in the area to be positioned. In the actual working process, the installer puts each identification card into the card slot of the positioning terminal corresponding to the identification card, that is, the SIM card with the second number is inserted into the card slot of the positioning terminal with the first number corresponding to the second number. In this process, the installer cannot know the data in the SIM card, cannot even obtain the positioning data generated in any subsequent steps, and then, enables each positioning terminal to automatically read data in the identification card in the card slot.

Step 4, each positioning terminal transmits the data read by each positioning terminal to a service terminal respectively, and verifies whether the read data is accurate through the service terminal; the service terminal sends verification success information or verification failure information to each positioning terminal according to verification results, wherein if the verification results are accurate, the service terminal sends the verification success information to the corresponding positioning terminal, and if the verification results are inaccurate, the service terminal sends the verification failure information to the corresponding positioning terminal, and the positioning terminal starts to operate normally when receiving the verification success information.

Step 5, the Beidou differential positioning data is generated by the positioning base station, a positioning satellite and the positioning terminals operating normally to realize Beidou differential positioning, and the Beidou differential positioning data is stored in each positioning terminal correspondingly. In the present embodiment, the Beidou differential positioning is specifically implemented in the following manner: the positioning terminals operating normally obtains first position data by using an internal positioning module and sends the first position data to the positioning base station; the positioning base station obtains second position data from the positioning satellite, calculates an error based on the first position data and the second position data to obtain correction data, and then sends the correction data to the corresponding positioning terminal; the positioning terminals adjust the first position data by using the correction data to obtain the Beidou differential positioning data and stores the Beidou differential positioning data.

Second Embodiment

Based on the same inventive concept as the first embodiment, the present embodiment provides a system of the method in the first embodiment, the detailed description is as follows. As shown in FIG. 2, the present embodiment discloses a system for preventing leakage of Beidou differential positioning data, the system includes system for preventing leakage of Beidou differential positioning data 2, a positioning satellite 1, a service terminal 3, a card issuing device, a plurality of identification cards 4 and a plurality of positioning terminals 5, wherein the positioning terminals 5 and the service terminal 3 are installed in an area to be positioned, the positioning terminals 5 and the service terminal 3 are connected through wireless communication, the service terminal 3 and the positioning satellite 1 are connected through the wireless communication, and the positioning base station 2, the positioning satellite 1 and the positioning terminals 5 operating normally are collectively configured to generate the Beidou differential positioning data.

The positioning terminals 5 are provided with card slots for placing the identification cards 4, and are configured to read data in the identification cards 4 in the card slots, and are further configured to store the generated Beidou differential positioning data, wherein each positioning terminal 5 corresponds to a first number respectively.

The card issuing device is configured to make the identification cards 4 and write data into the identification cards 4 respectively according to the positioning terminal 5 corresponding to each identification card 4. In the present embodiment, the identification cards 4 are SIM cards, and the data written into the identification cards 4 includes a server address, a port, an account number, a user name, a password and a transmission protocol.

The identification cards 4 are configured to be put into the card slots of the positioning terminals 5, each identification card 4 corresponds to a second number respectively, and the second number corresponds to the first number one by one.

The service terminal 3 is configured to receive the data read by the positioning terminals 5 from the identification cards 4 and verify whether the read data is accurate, and is configured to send verification success information or verification failure information to the positioning terminals 5 according to the verification results, wherein the positioning terminals receiving the verification success information start to operate normally.

More specifically, the positioning terminals 5 include a positioning module configured to obtain first position data based on an internal positioning module in a normal operation, and send the first location data to a positioning base station 2.

The positioning base station 2 is configured to obtain second position data from the positioning satellite 1, calculate an error based on the first position data and the second position data to obtain correction data, and send the correction data to a corresponding positioning terminal 5. The positioning terminal 5 is further configured to obtain Beidou differential positioning data by using the correction data and the first position data, and stores the Beidou differential positioning data.

The positioning satellite 1 is configured to send the second position data to the positioning base station 2.

In the present embodiment, the positioning terminals 5 include a first data transmission module, a first data receiving module, a first calculation module and a storage module, and the positioning base station 2 includes a second data receiving module, a second data transmission module and a second calculation module. The positioning base station 2 may also be more than one (FIG. 2 shows one positioning base station).

The first data transmission module is configured to send the data read from the identification cards 4 and the first position data to the positioning base station 2.

The first data receiving module is configured to receive the verification success information or the verification failure information sent by the positioning base station 2, and is configured to receive the correction data from the positioning base station 2 when the positioning terminals 5 operate normally.

The first calculation module is configured to calculate the first position data by using the position information obtained by the positioning module.

The storage module is configured to store the generated Beidou differential positioning data.

The second data receiving module is configured to receive the data read by the positioning terminals 5 from the identification cards in the card slots 4, the first position data and the second position data.

The second data transmission module is configured to send the verification success information or the verification failure information to the positioning terminals 5, and is configured to send the correction data to the positioning terminals 5.

The second calculation module is configured to calculate the error based on the first position data and the second position data to obtain the correction data.

The present disclosure will be described in more detail below by examples.

A positioning item with a measured area requires 500 positioning terminals. When producing terminal devices, specific positions of 500 terminal devices will be configured, and then the positioning terminals numbered from 1 to 500 will be produced. After that, a card issuing system will make SIM cards numbered from 1 to 500, and a server address, a port, an account number, a user name, a password and a transmission protocol and other data corresponding to the configuration position will be written in each SIM card.

After the production is completed, an installation will be performed by the installer. During the installation, each positioning terminal can only work if the SIM cards with the corresponding number are inserted, otherwise an error will be reported. After inserting the SIM cards, the positioning terminals will read the server address, the port, the account number, the user name, the password, the transmission protocol and other data in the SIM cards, and transmit the data to the service terminal through the transmission module for verification. The positioning terminals can operate normally only after the verification is successful.

The positioning terminals operating normally transmit the positioning data acquired by the positioning module to a plurality of positioning base stations in the area through the transmission module, the plurality of positioning base stations calculate errors and obtain corrected data through the positioning data provided by the positioning satellite and the positioning data provided by the positioning terminals, then send the corrected data to the corresponding positioning terminal, and the positioning terminals adjust the positioning data after receiving the corrected data through the receiving module to obtain the final Beidou differential positioning data. The above-mentioned process can also eliminate or weaken errors affecting the positioning accuracy, thereby improving the positioning accuracy of satellite effectively.

In the present disclosure, unless otherwise explicitly specified and defined, the terms "installed", "connected", "joined", "fixed", and the like should be understood broadly, for example, they may be fixed connection, detachable connection or integrated; It can be mechanical connection or electrical connection. It can be directly connected or indirectly connected through an intermediate medium, and it can be the communication between two elements or the interaction between two elements, unless otherwise explicitly defined. For those of ordinary skill in the art, the specific meanings of the above terms in the present disclosure can be understood according to specific situations.

In the description of this specification, the description referring to the terms "the embodiment", "one embodiment", "some embodiments", "examples", "specific examples", "some examples", or the like means that the specific features, structures, materials, or characteristics described in connection with the embodiment or example are included in at least one embodiment or example of the present disclosure. In this specification, the schematic representation of the above-mentioned terms does not necessarily refer to the same embodiment or example. Moreover, the specific features, structures, materials, or characteristics described may be combined in any one or more embodiments or examples in a suitable manner. In addition, those skilled in the art can combine and combine different embodiments or examples described in this specification and features of different embodiments or examples without contradicting each other.

Furthermore, the terms "first" and "second" are merely intended for a purpose of description, and shall not be understood as an indication or implication of relative importance or an implicit indication of a quantity of indicated technical features. Therefore, features limited by "first" or "second" may explicitly or implicitly include at least one of the features. In the description of the present disclosure, "multiple" means at least two, for example, two, three, or the like, unless otherwise specified.

The above descriptions are merely some exemplary embodiments of the present disclosure, but are not intended to limit the present disclosure. Any modification, equivalent replacement, or improvement made without departing from the spirit and principle of the present disclosure shall fall within the scope of the disclosure.

INDUSTRIAL PRACTICABILITY

According to the method and the system for preventing leakage of Beidou differential positioning data provided by the present disclosure, the positioning terminals are bound by the identification cards, and the data is written into each identification card according to the positioning terminal corresponding to each identification card respectively, so that the installer are prevented from contacting plaintext configuration information, the leakage of the configuration information caused by intentional or negligent of the installer is prevented, and malicious acquisition of the Beidou differential positioning data is effectively avoided. The Beidou differential positioning data is stored in the positioning terminals, thereby realizing discrete storage of the Beidou differential positioning data, and avoiding the problems that the traditional server storage mode may be invaded by hackers and the like. The present disclosure is beneficial to realize the security of positioning data on a large number of terminals in a wider range.

What is claimed is:

1. A method for preventing leakage of Beidou differential positioning data, the method comprises the following steps:
   step 1, determining the number of positioning terminals to be used according to an area of an area to be positioned, and setting a first number for each positioning terminal respectively, wherein the positioning terminals are provided with card slots for placing identification cards;
   step 2, making the identification cards through a card issuing device, wherein the number of the identification cards is the same as that of the positioning terminals; in the process of making the identification cards, setting a second number for each identification card respectively, wherein the second number corresponds to the first number one by one, so that one identification card corresponds to one positioning terminal, and writing data into each identification card respectively according to the positioning terminal corresponding to each identification card;
   step 3, installing at least one positioning base station and each positioning terminal in the area to be positioned, putting each identification card into the card slot of the positioning terminal corresponding to the identification card, and enabling each positioning terminal to automatically read data in the identification card in the card slot;
   step 4, transmitting, by each positioning terminal, the data read by each positioning terminal to a service terminal, and verifying whether the read data is accurate through the service terminal, sending, by the service terminal, verification success information or verification failure information to each positioning terminal according to verification results, and starting, by the positioning terminal, to operate normally when receiving the verification success information; and
   step 5, generating the Beidou differential positioning data by the positioning base station, a positioning satellite and the positioning terminals operating normally, and storing the Beidou differential positioning data in each positioning terminal correspondingly.

2. The method for preventing leakage of Beidou differential positioning data according to claim 1, wherein
   in step 5, the positioning terminals operating normally obtains first position data by using an internal positioning module and sends the first position data to the positioning base station; the positioning base station obtains second position data from the positioning satellite, calculates an error based on the first position data and the second position data to obtain correction data, and sends the correction data to the corresponding positioning terminal; the positioning terminals adjust the first position data by using the correction data to obtain the Beidou differential positioning data and store the Beidou differential positioning data.

3. The method for preventing leakage of Beidou differential positioning data according to claim 1, wherein
   in step 1, the method further comprises the step of determining the number of the positioning base stations to be used according to the area of the area to be positioned, and the step of determining the position of each positioning terminal and the position of each positioning base station according to the area to be positioned.

4. The method for preventing leakage of Beidou differential positioning data according to claim 3, wherein the identification cards are SIM cards.

5. The method for preventing leakage of Beidou differential positioning data according to claim 1, wherein
   in step 2, the data written into the identification cards comprises a server address, a port, an account number, a user name, a password and a transmission protocol.

6. A system for preventing leakage of Beidou differential positioning data, wherein the system comprises a positioning satellite, a positioning base station, a service terminal, a card issuing device, a plurality of identification cards and a plurality of positioning terminals, wherein the positioning terminals and the service terminal are installed in an area to be positioned, the positioning terminals and the service terminal are connected through wireless communication, the service terminal and the positioning satellite are connected through the wireless communication, and the positioning base station, the positioning satellite and the positioning terminals operating normally are collectively configured to generate the Beidou differential positioning data;
   the positioning terminals are provided with card slots for placing the identification cards, and are configured to read data in the identification cards in the card slots, and are further configured to store the generated Beidou differential positioning data, wherein each positioning terminal corresponds to a first number respectively;
   the card issuing device is configured to make the identification cards and write data into the identification cards respectively according to the positioning terminal corresponding to each identification card;
   the identification cards are configured to be put into the card slots of the positioning terminals, each identification card corresponds to a second number respectively, and the second number corresponds to the first number one by one; and
   the service terminal is configured to receive the data read by each positioning terminal from the identification card and verify whether the read data is accurate, and is configured to verification success information or verification failure information to each positioning terminal according to verification results, wherein the positioning terminal receiving the verification success information starts to operate normally.

7. The system for preventing leakage of Beidou differential positioning data according to claim 6, wherein
   the positioning terminals comprise a positioning module configured to obtain first position data based on an internal positioning module in a normal operation, and send the first location data to a positioning base station;

the positioning base station is configured to obtain second position data from the positioning satellite, calculate an error based on the first position data and the second position data to obtain correction data, and is configured to send the correction data to a corresponding positioning terminal; the positioning terminal is further configured to obtain Beidou differential positioning data by using the correction data and the first position data, and stores the Beidou differential positioning data; and the positioning satellite is configured to send the second position data to the positioning base station.

8. The system for preventing leakage of Beidou differential positioning data according to claim 7, wherein the positioning terminals comprise a first data transmission module, a first data receiving module, a first calculation module and a storage module, and the positioning base station comprises a second data receiving module, a second data transmission module and a second calculation module;

the first data transmission module is configured to send the data read from the identification cards and the first position data to the positioning base station;

the first data receiving module is configured to receive the verification success information or the verification failure information sent by the positioning base station, and is configured to receive the correction data from the positioning base station when the positioning terminals operate normally;

the first calculation module is configured to calculate the first position data by using the position information obtained by the positioning module;

the storage module is configured to store the generated Beidou differential positioning data;

the second data receiving module is configured to receive the data read by the positioning terminals from the identification cards in the card slots, the first position data and the second position data;

the second data transmission module is configured to send the verification success information or the verification failure information to the positioning terminals, and is configured to send the correction data to the positioning terminals; and the second calculation module is configured to calculate the error based on the first position data and the second position data to obtain the correction data.

9. The system for preventing leakage of Beidou differential positioning data according to claim 6, wherein the identification cards are SIM cards.

10. The system for preventing leakage of Beidou differential positioning data according to claim 6, wherein the data written into the identification cards comprises a server address, a port, an account number, a user name, a password and a transmission protocol.

11. The method for preventing leakage of Beidou differential positioning data according to claim 2, wherein in step 1, the method further comprises the step of determining the number of the positioning base stations to be used according to the area of the area to be positioned, and the step of determining the position of each positioning terminal and the position of each positioning base station according to the area to be positioned.

12. The method for preventing leakage of Beidou differential positioning data according to claim 11, wherein the identification cards are SIM cards.

13. The method for preventing leakage of Beidou differential positioning data according to claim 4, wherein in step 2, the data written into the identification cards comprises a server address, a port, an account number, a user name, a password and a transmission protocol.

14. The method for preventing leakage of Beidou differential positioning data according to claim 12, wherein in step 2, the data written into the identification cards comprises a server address, a port, an account number, a user name, a password and a transmission protocol.

15. The method for preventing leakage of Beidou differential positioning data according to claim 7, wherein the identification cards are SIM cards.

16. The system for preventing leakage of Beidou differential positioning data according to claim 8, wherein the identification cards are SIM cards.

17. The system for preventing leakage of Beidou differential positioning data according to claim 7, wherein the data written into the identification cards comprises a server address, a port, an account number, a user name, a password and a transmission protocol.

18. The system for preventing leakage of Beidou differential positioning data according to claim 8, wherein the data written into the identification cards comprises a server address, a port, an account number, a user name, a password and a transmission protocol.

\* \* \* \* \*